(12) United States Patent
De Boer (10) Patent No.: US 10,400,753 B2
(45) Date of Patent: Sep. 3, 2019

(54) METHOD FOR FEEDING IN ELECTRICAL ENERGY BY MEANS OF A WIND TURBINE

(71) Applicant: WOBBEN PROPERTIES GMBH, Aurich (DE)

(72) Inventor: Wolfgang De Boer, Moormerland (DE)

(73) Assignee: Wobben Properties GmbH, Aurich (DE)

( * ) Notice: Subject to any disclaimer, the term of this patent is extended or adjusted under 35 U.S.C. 154(b) by 126 days.

(21) Appl. No.: 15/302,472

(22) PCT Filed: Mar. 31, 2015

(86) PCT No.: PCT/EP2015/057122
§ 371 (c)(1),
(2) Date: Oct. 6, 2016

(87) PCT Pub. No.: WO2015/155080
PCT Pub. Date: Oct. 15, 2015

(65) Prior Publication Data
US 2017/0022975 A1    Jan. 26, 2017

(30) Foreign Application Priority Data

Apr. 9, 2014   (DE) ........................ 10 2014 206 884

(51) Int. Cl.
*H02J 1/00*      (2006.01)
*H02J 3/00*      (2006.01)
(Continued)

(52) U.S. Cl.
CPC ............. *F03D 7/048* (2013.01); *F03D 7/028* (2013.01); *F03D 7/0264* (2013.01);
(Continued)

(58) Field of Classification Search
CPC . F03D 7/048; F03D 9/257; F03D 9/25; F03D 80/60; F03D 7/0264; F03D 7/028;
(Continued)

(56) References Cited

U.S. PATENT DOCUMENTS 6,809,431 B1   10/2004   Schippmann
8,738,192 B2    5/2014   Uphues et al.
(Continued)

FOREIGN PATENT DOCUMENTS

CN         1833103 A    9/2006
CN       101169103 A    4/2008
(Continued)

*Primary Examiner* — Richard Tan
(74) *Attorney, Agent, or Firm* — Seed Intellectual Property Law Group LLP (57) ABSTRACT

A method for feeding electric energy into an electric power supply network by means of a wind turbine, wherein the wind turbine generates electric power from wind having a variable wind speed by means of an aerodynamic rotor and a generator and feeds it at least partially into the electric power supply network and/or uses it at least partially for supplying electric devices of the wind turbine, wherein the generated electric real power is set as function of an ambient temperature and/or wherein the rotor has a variable rotational speed and the rotational speed is set as a function of the ambient temperature.

17 Claims, 4 Drawing Sheets

(51) Int. Cl.
*F03D 7/04* (2006.01)
*F03D 7/02* (2006.01)
*F03D 9/25* (2016.01)
*F03D 80/60* (2016.01)
*H02J 3/38* (2006.01)

(52) U.S. Cl.
CPC .............. *F03D 7/0276* (2013.01); *F03D 9/25* (2016.05); *F03D 9/257* (2017.02); *F03D 80/60* (2016.05); *H02J 3/386* (2013.01); *F05B 2240/2211* (2013.01); *F05B 2270/1033* (2013.01); *F05B 2270/303* (2013.01); *F05B 2270/32* (2013.01); *F05B 2270/325* (2013.01); *Y02E 10/723* (2013.01); *Y02E 10/725* (2013.01); *Y02E 10/726* (2013.01)

(58) Field of Classification Search
CPC .. F03D 7/0276; H02J 3/386; F05B 2270/303; F05B 2270/32; F05B 2240/2211; F05B 2270/325; F05B 2270/103; Y02E 10/723; Y02E 10/726; Y02E 10/725
USPC .......................................................... 307/84
See application file for complete search history.

(56) References Cited

U.S. PATENT DOCUMENTS

| | | | |
|---|---|---|---|
| 9,394,884 | B2 | 7/2016 | Laurberg |
| 2008/0112807 | A1* | 5/2008 | Uphues ................ F03D 7/0224 416/1 |
| 2009/0289461 | A1 | 11/2009 | Larsen |
| 2011/0198846 | A1 | 8/2011 | Wakasa et al. |
| 2012/0009066 | A1* | 1/2012 | Vilbrandt .............. F03D 7/0224 416/153 |
| 2012/0203384 | A1* | 8/2012 | Arlaban Gabeiras ..... H02J 3/06 700/286 |
| 2013/0101413 | A1 | 4/2013 | Esbensen et al. |
| 2014/0193254 | A1 | 7/2014 | Gopolan et al. |
| 2016/0076515 | A1* | 3/2016 | Petersen ................ F03D 7/026 290/44 |

FOREIGN PATENT DOCUMENTS

| | | |
|---|---|---|
| CN | 102192086 A | 9/2011 |
| CN | 102474212 A | 5/2012 |
| DE | 19844258 A1 | 3/2000 |
| DE | 102011003974 A1 | 8/2012 |
| EP | 0847496 B1 | 8/2000 |
| EP | 0842360 B1 | 12/2000 |
| EP | 1918581 A2 | 5/2008 |
| EP | 2535567 A2 | 12/2012 |
| EP | 2700815 A1 | 2/2014 |
| EP | 2762720 A2 | 8/2014 |

* cited by examiner

METHOD FOR FEEDING IN ELECTRICAL ENERGY BY MEANS OF A WIND TURBINE

BACKGROUND

Technical Field

The present disclosure relates to a method for feeding electric energy into an electrical power supply network, which may also be a locally delimited stand-alone network, by means of a wind turbine. In addition, the present disclosure relates to a wind turbine for implementing such a method, and the present disclosure relates to a wind farm made up of multiple wind turbines.

Description of the Related Art

Wind turbines are known and are generally used to generate electric energy from wind and to feed it into an electrical power supply network. Unfavorable environmental conditions may be problematic for such methods or for wind turbines used to carry them out. One environmental condition is, for example, the prevailing wind. Wind turbines are generally adaptable to the particular wind conditions via their controllers, and wind turbines are also generally designed for specific wind classes, for example, locations having weak winds or locations having strong winds. If, by way of exception, the wind becomes so strong that it may pose a risk to the wind turbine, measures must be taken to protect the wind turbine. One such example of taking storms into account is described in the European patent EP 0 847 496. There, it has already been proposed to reduce the operation of the wind turbine as the wind increases further, in the event of wind which is too strong.

Methods are also known which deal with ice formation on rotor blades and, for example, propose heating a rotor blade for de-icing purposes, for example, the document EP 0 842 360.

However, completely different problems may occur if particularly wet or dry conditions or particularly warm or cold conditions occur. It is often advisable to design the wind turbine for these specific locations. For example, the wind turbine manufacturer ENERCON operates a wind turbine in the Antarctic which is subjected to conditions which are completely different, for example, from those of a wind turbine in Spain. Very low temperatures may affect totally different characteristics of the wind turbine. For example, the wind turbine may experience higher loads due to higher air density. This becomes noticeable in particular on the rotor blades, and may thus be observed indirectly or even directly on the tower. Higher notched impact strength of the cast materials may also be a result of particularly low temperatures. Low temperatures also affect the viscosity of the lubricants, which in particular become more viscous as a result, thus affecting the lubricity and possibly even inhibiting it in extreme cases. Even composite fiber materials may be affected by low temperatures and may, for example, become brittle.

Designing the specific materials for very low temperatures may be extremely costly and may also frequently result in a highly customized approach, for which empirical values are thus often non-existent or limited. In addition, although there are cold and hot locations, the temperatures at a single location are not always equally cold or hot. As is generally known, there are locations, in particular continental locations, having very high temperature fluctuations. These temperature fluctuations may occur in a distributed manner both over the course of the year and over the course of the day, or may become quite noticeable during the transition between day and night.

The German Patent and Trade Mark Office have researched the following related art in the priority application for the present application: DE 10 2011 003 974 A1, US 2013/0101413 A1 and EP 2 535 567A2.

BRIEF SUMMARY

An approach is to be proposed which is suitable for very low temperatures, in particular which prevents damage to the wind turbine at very low temperatures. At least one alternative approach is to be provided versus known approaches.

According to the present disclosure, a method according to claim 1 is proposed. This method is directed to a wind turbine which is operated using a method for feeding electric energy into an electric power supply network. The wind turbine has an aerodynamic rotor and a generator which generate electric power from wind having a variable wind speed. This electric power is preferably fed into an electrical power supply network. However, it is advantageous to use a portion of this power for electric devices of the wind turbine, i.e., to divert a portion of the generated power for internal use. In the extreme case, which is described below, it may be advantageous to feed in none of the generated electric power into the network and to use the generated power completely for internal requirements.

It is now proposed that the generated electric power, i.e., the generated real power P, is set as a function of an ambient temperature. First and foremost, the generated electric power, during stationary or quasi-stationary operation in any case, is based on the wind, which essentially determines the maximum power. However, on this basis, the generated power may be reduced. In particular, such a reduction is now set as a function of the temperature, i.e., in particular an ambient temperature, which is in particular recorded as an outside temperature, i.e., outside the wind turbine. Preferably, after a first limit temperature has been reached, the generated electric power is reduced as the temperature falls further. The reduction may preferably be reduced linearly as the temperature falls further. A straight line thus results for this section in a temperature-power diagram.

In this respect, it has been found that even in a very cold location which does not always have to be extremely cold, a wind turbine may be operated in which at least many elements may correspond to a wind turbine which is not designed for particularly cold regions. The proposed method for operating the wind turbine may at least reduce the necessity for a highly specific adaptation of the wind turbine to a very cold location. Of course, despite the application of the proposed method, a temperature-specific adaptation may be carried out; in particular special materials may be used. Preferably, composite fiber materials in particular are designed, tested and preferably also certified for such extremely cold temperatures, in order to assure the turbine operator of the reliability of these components.

However, it has been found that by reducing the generated power, the load on the wind turbine is reduced; therefore, components of the wind turbine which are subjected to the cold temperatures are at least loaded less as a result. To put it somewhat simply, the reduction of the generated power at particularly low temperatures takes into account a degraded durability, a degraded resilience or a similar effect of temperature on the relevant components.

In addition or alternatively, it is proposed to set the rotational speed as a function of the ambient temperature, if a rotor having variable rotational speed is present. Here as well, it is particularly proposed to reduce the rotational speed as the temperature falls further, after a first limit temperature has been reached. Here as well, one specific embodiment proposes providing for a linear reduction as the temperature falls further. The first limit temperature for power reduction and the first limit temperature of the rotational speed reduction may have the same limits or the same values, so that the rotation speed and power may thus be reduced simultaneously, in particular after the first limit temperature has been reached. However, specific embodiments are also proposed in which the first limit temperature for the power reduction on the one hand, and for the rotational speed reduction on the other hand, are different.

The reduction of the rotational speed at particularly low temperatures, in particular further reduction with further falling temperature, particularly takes into account effects of the lubrication. If the temperatures fall to very low levels, the lubricants become particularly thick, i.e., have a higher viscosity, and are thus no longer able to lubricate as well as they did previously. This does not mean that the turbine necessarily has to be brought to a stop immediately; rather, it has been found that a reduction of the rotational speed may be sufficient to take into account the change in viscosity.

Such a reduced rotational speed may also be achieved by turning the rotor blades partially away from the wind. As a result, the load which the wind places on these blades also changes. This wind load may be particularly strong especially at low temperatures due to the higher air density. By turning the rotor blades partially away from the wind, this problem is taken into account in several respects. On the one hand, the working surface of the rotor blades is reduced, and on the other hand, the working angle is also reduced, which also reduces the load. The reduction of the rotational speed also directly reduces the load on the rotor.

Preferably, it is thus proposed to reduce the rotational speed and/or the generated power by adjusting the rotor blades.

Preferably, it is proposed to shut down the wind turbine when a second limit temperature is reached which is less than the first limit temperature. This is a safety measure which is thus proposed only in the event that this very low second limit temperature is reached. The first limit temperature may, for example, have a value of −30° Celsius, and the second limit temperature may have a value of −40° Celsius.

Alternatively, it is proposed that the complete shutdown of the wind turbine is avoided and that it is operated with power which is as low as possible, and in addition or alternatively, at a rotational speed which is as low as possible. A power level which is as low as possible may be such a level which is required only for powering the electric devices or at least the most important electric devices. The operation of the wind turbine may be adjusted to this level, and such operation generally generates in the range of only approximately 10% of the nominal power or less. Similarly, the rotational speed may also generate in the range of 10% of the nominal rotational speed. The turbine is thus run somewhat above no-load operation.

This approach also takes into account a problem which would be particularly relevant to the Antarctic, but which may also be relevant in other remote locations, i.e., that a so-called stand-alone network exists, i.e., a network which is very small and autonomous. In the extreme case, the wind turbine is the only generator for this stand-alone network, or a diesel generator or a similar generator is possibly also provided for emergencies, or an electric store is present which is able to provide appropriate energy. In such a situation, the proposed variant ensures that the wind turbine is able to maintain its operation as autonomously as possible and in particular is again able to start up or at least partially start up without great effort if the temperature again increases somewhat. Particularly in continental regions in which there is a large fluctuation between day and night, the very extreme low temperatures, i.e., in the particular temperatures in the range of the second limit temperature, may occur, for example, for a few hours.

Thus, the wind turbine is then able to start up without having to draw current from the network (electric power supply network). Such current may be very expensive, or may possibly be unavailable or very difficult to obtain in the case of small stand-alone networks. For example, in a stand-alone network, a diesel generator might possibly have to be placed into operation initially in order to be able to start up the wind turbine afterwards.

All of this is avoided if the wind turbine continues to be operated at low power for its own use.

Preferably, a portion of the generated power or possibly the total generated power is used for heating the rotor blades of the rotor, for heating the generator, for heating at least one droplet separator for drying air, for heating at least one measurement device, for heating at least one control device and/or for heating at least one internal space of the wind turbine, in particular for heating the internal space of a nacelle or the internal space of a tunnel. The heating may also be carried out as a function of temperature and is generally required for the rotor blades only at temperatures around the freezing point, since only then does ice formation generally occur, which may advantageously be prevented.

Heating the generator is in particular intended to prevent the formation of moisture which may occur at low outside temperatures. For the same reason, droplet separators are provided which may be used for drying internal spaces, in particular may carry out a first dehumidification of inflowing moist air. Water freezing onto such droplet separators may impair their functional capability; therefore, it is recommended to heat them when temperatures are correspondingly low. Measuring devices, in particular a wind speed measuring device, may be heated when temperatures are correspondingly low in order to maintain their functional capability and thus the controllability of the wind turbine.

Heating a control device is also used especially to prevent moisture formation. Heating a control device in particular also includes heating at least one switch cabinet. In particular during nominal operation, such a switch cabinet is able to heat itself due to the flowing currents. However, during sharply reduced operation or if there is very little wind, such internal heat production may be too small or may only affect a locally delimited portion of the switch cabinet. To prevent the formation of condensation, it may therefore be advantageous to heat a switch cabinet or another control device, especially when outside temperatures are very low.

Heating internal spaces, in particular the nacelle and/or the tower, may also prevent moisture formation there, in particular condensation formation, and also results in correspondingly dry, pre-heated air, which then also has an advantageous effect on the other aforementioned elements and may possibly facilitate the heating there. Heating such internal spaces may then act as pre-heating.

If the wind turbine is operated at very low power, i.e., only the amount of power is generated which is required for its own operation, this power is also used for heating, at least for heating some of the aforementioned areas. However, this power may also be used for other functions, i.e., particularly also for providing an excitation current for the generator if a separately excited synchronous generator is used, i.e., a synchronous generator which uses no permanent magnets.

It is thus proposed particularly to operate the wind turbine in such a way that the generator generates current which is used for heating the turbine, at least important electric devices of the wind turbine.

Preferably, the generated power and/or the rotational speed is set as a function of the wind speed; in particular, after reaching a first threshold wind speed, the generated power and/or the rotational speed is reduced as the wind speed increases further. In particular, a linear reduction is carried out as the wind speed increases further, in particular, up to the point of reaching a second, even higher, threshold speed. In particular, a so-called storm range is proposed for reducing the generated power and/or the rotational speed, and in this respect, this is combined with the setting, in particular the reduction, of the power as a function of the outside temperature. It has in fact been found that when the wind turbine is loaded, these parameters may interact or mutually influence each other with respect to their effect on the wind turbine. Here, it is proposed to consider them collectively.

For example, the combination occurs in such a way that the power and/or rotational speed is reduced as soon as the temperature has reached or fallen below the first limit temperature while falling, or the wind speed has reached or exceeded the first wind speed threshold value while rising. The reduction thus occurs if one of these criteria has been met. If both criteria have been met, that reduction of the rotational speed and/or power is carried out which represents the larger reduction or sharper reduction from among the two criteria.

According to one specific embodiment, it is proposed that the first and/or second limit temperature is set as a function of the prevailing wind speed, in particular as a function of a 10-minute average value of the wind speed. This occurs in particular in such a way that the higher the wind speed is, the higher the first or second limit temperature is set. Thus, if a particularly high wind speed prevails, the temperature-dependent power reduction should begin sooner, i.e., at higher temperatures, than if the prevailing wind speed is lower.

Preferably, it is proposed that the first and/or second threshold wind speed is set as a function of the ambient temperature. Here, it is proposed that the lower the ambient temperature is, the lower the first or second threshold wind speed is set. If particularly low temperatures exist, a wind speed-dependent power reduction begins sooner. As a result, it may be taken into account that at low temperatures, the turbine is less resilient, for example, its mechanical elements may be more fragile. As a result, the power and/or rotational speed reduction is carried out earlier during high wind, and the load level of the wind turbine is thus lowered via control technology.

By changing the first and second limit temperatures, it is possible to change this curve between these two limit temperatures, particularly in the case of a linear curve. The two limit temperatures, along with the corresponding power and/or rotational speed values, may therefore define and thus accordingly change a straight section of the characteristic curve. Analogously, a curve of the wind speed-dependent rotational speed reduction or power reduction may be carried out by changing the first or second threshold wind speed.

Changing the first and second limit temperatures as a function of the wind speed may be meaningful particularly in the case of day-night cyclical temperature fluctuations, if the temperature changes rapidly.

A temperature-dependent change of the threshold wind speeds, i.e., virtually the inverse case, may be meaningful particularly in the case of seasonal temperature changes. In other words, the wind turbine sets itself to summer or winter and correspondingly provides an earlier wind speed-dependent rotational speed or power reduction in winter, which may only begin later in summer i.e., at higher wind speeds.

This illustrated division into summer and winter is a very rough but possible division. For example, during winter operation, a wind speed-dependent rotational speed reduction or power reduction may be generally be provided, which begins earlier than in the case of a rotational speed reduction or power reduction during summer operation. A differentiation into summer operation and winter operation is thus one proposal. However, such threshold value shifts may preferably be provided continuously or at least in smaller steps.

Another specific embodiment proposes that the wind turbine is prepared to feed in reactive power, and the feed-in of the reactive power is carried out as a function of the ambient temperature and/or as a function of the wind speed. Preferably, after the first limit temperature has been reached, the reactive power is reduced as the temperature falls further, in particular linearly. In addition or alternatively, after reaching the first threshold wind speed, it is reduced as the wind speed increases further, in particular, linearly.

The feed-in of reactive power is to be understood to be a service provided by the wind turbine for the network. Reactive power may generally be fed in even without power generation, i.e., without the generation of real power by the wind turbine, if the wind turbine operates in a mode in which it is in phase shifter operation, i.e., draws current from the network and feeds it back in having a changed phase angle. In other words, the reactive power is not directly coupled to the generated real power. However, it has been found that, particularly for some electric control devices, in particular inverters, and also for electric lines, their load may be a function of the generated current which is transferred or routed. Thus, it is proposed also to reduce the reactive power in the case of turbine loading due to low temperatures and/or heavy winds. In addition, it has been found that it is better to feed reduced reactive power into the network than to feed no reactive power into the network at all. This may also be better achieved via the proposed reduction of reactive power for protecting the turbine, i.e., instead of completely shutting down the operation of the turbine.

According to the present disclosure, a wind turbine is also proposed which is operated according to at least one of the above specific embodiments of the method for feeding electric energy into an electric power supply network. Preferably, such a wind turbine has at least one heatable droplet separator for drying internal air or keeping it dry. This heatable droplet separator is thus also suitable for very low ambient temperatures and may, as described, then be used particularly for drying the internal air or keeping it dry.

Preferably, the wind turbine comprises switch cabinets which are heated. This particular feature also improves the operating capability of a wind turbine in particularly cold regions or under particularly cold environmental conditions. Preferably, the switch cabinets and/or the droplet separators are heated as soon as an internal temperature or ambient temperature falls below a trigger temperature for triggering the heating. Thus, no permanent heating of these elements must be carried out; rather, this may be carried out as required. The outside temperature is an important indicator for this. The internal temperature may also take into account the degree to which, for example, the turbine operation as such has already resulted in a certain degree of heating.

Furthermore, a wind farm is proposed which includes multiple wind turbines according to at least one of the specific embodiments described above. Accordingly, a wind farm may be provided which is deployable in cold regions and is able to ensure a power supply there. Preferably, this wind farm feeds into the electric power supply network via a shared network feed-in point, and is preferably controlled via a central wind farm controller. The central wind farm controller may implement a portion of the method steps previously described for the operation of a single wind turbine. Preferably, each wind turbine controls itself; however, the higher-level controller may in particular specify target values, for example, the power to be generated, the reactive power to be fed in and even the rotational speed to be set for each of the wind turbines. As a result, the wind farm controller may particularly also incorporate any requirements of a network operator and decide, if applicable, whether a power or rotational speed which is higher than would be desirable for an optimal load protection may be set after all within the scope of at least transient tolerances. It is to be noted in this respect that loads which are too high, if they are within the limits, do not immediately destroy a turbine; rather, they may have disadvantageous effects over a longer period of time. Transient overshooting may thus be acceptable.

Preferably, a shared wind park controller may record some data. This particularly includes recording the ambient temperature and the prevailing wind speed. However, even if each turbine carries out an autonomous control, some boundary conditions, particularly the described rotational speed and power reductions, may be specified centrally, whereby oscillation problems may particularly be prevented. Particularly when taking wind speeds into account, it is to be noted that wind turbines standing one behind the other may influence each other.

BRIEF DESCRIPTION OF THE SEVERAL VIEWS OF THE DRAWINGS

The present disclosure is described in greater detail below by way of example with reference to the accompanying figures, based on exemplary embodiments.

DETAILED DESCRIPTION

Figure 1:
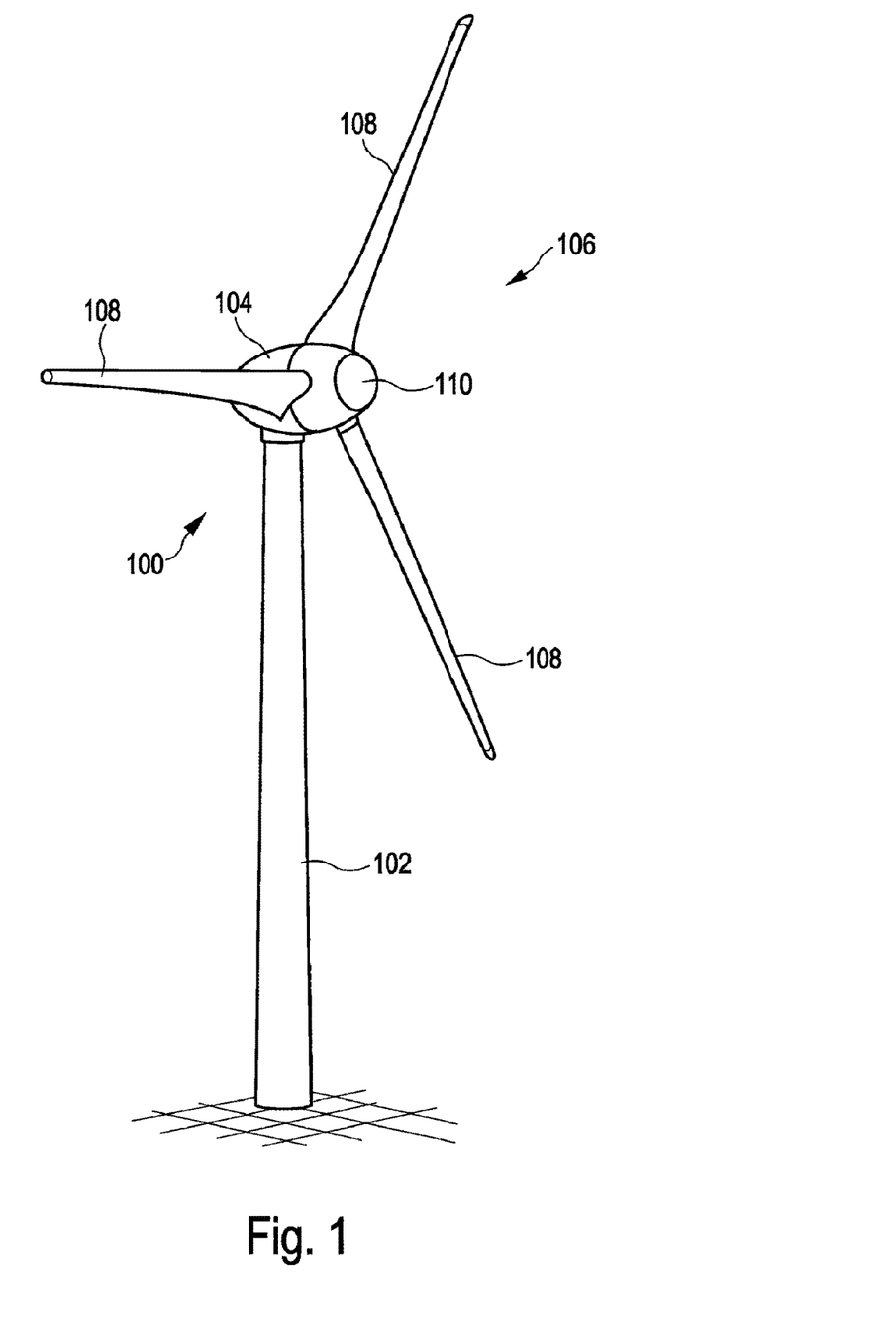
FIG. 1 depicts a wind turbine in a perspective view.

FIG. 1 depicts a wind turbine 100 including a tower 102 and a nacelle 104. A rotor 106 having three rotor blades 108 and a spinner 110 is situated on the nacelle 104. During operation, the wind causes the rotor 106 to rotate, thus driving a generator in the nacelle 104.

Figure 2:
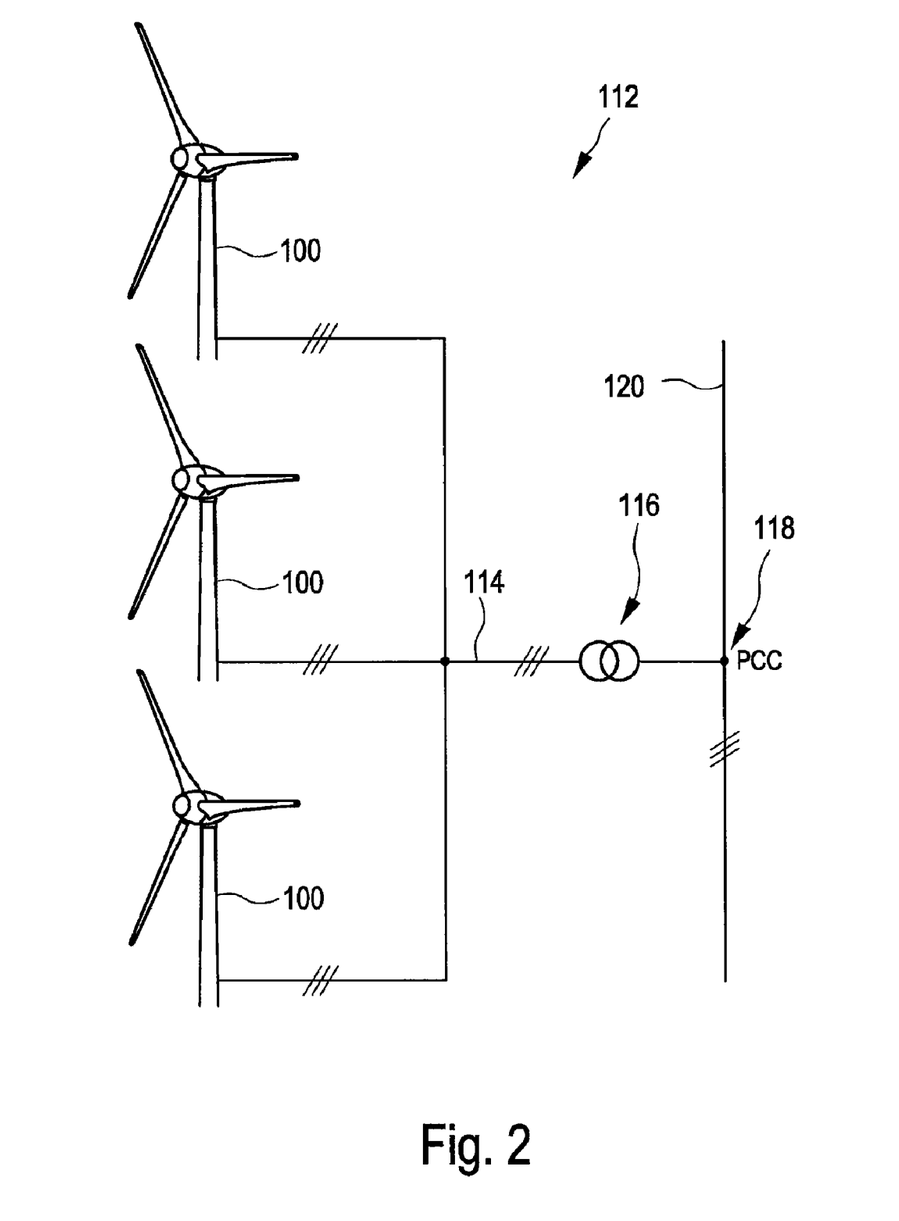
FIG. 2 schematically depicts a wind farm.

FIG. 2 shows a wind farm 112 including three wind turbines 100 by way of example, which may be identical or different. The three wind turbines 100 thus represent basically any arbitrary number of wind turbines on a wind farm 112. The wind turbines 100 provide their power, in particular the generated current, via an electrical farm network 114. The current and power generated by each of the wind turbines 100 is added up, and a transformer 116 is typically provided which steps up the voltage on the farm in order to feed into the power supply network 120 at the feed-in point 118, which is generally referred to as the PCC. FIG. 2 is a simplified representation of a wind farm 112, which, for example, does not depict a controller, although a controller is of course present. The farm network 114 may, for example, also be designed differently, for example, with a transformer also being present at the output of each wind turbine 100, just to mention a different exemplary embodiment.

Figure 3:
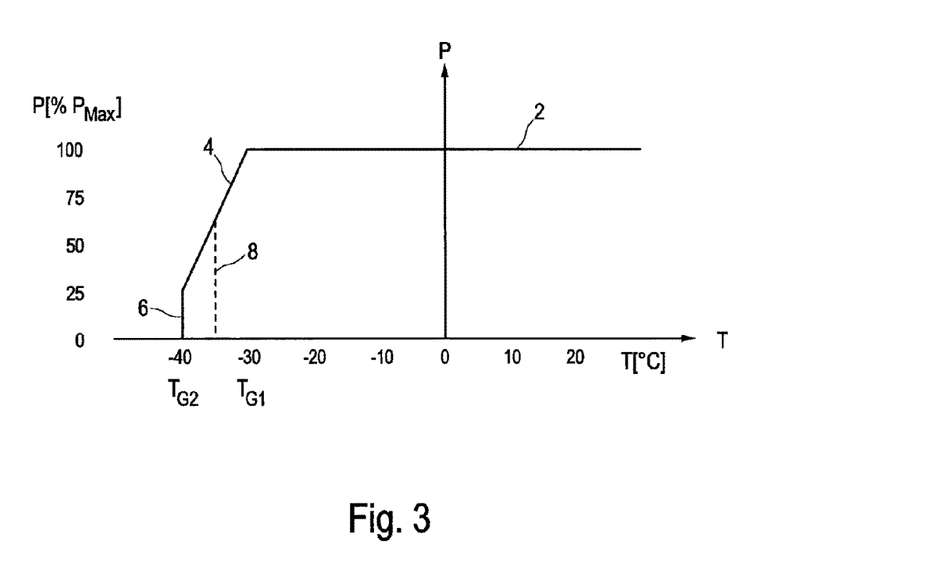
FIG. 3 depicts a temperature-dependent power characteristic curve which illustrates the temperature-dependent reduction of the generated power according to one specific embodiment.

FIG. 3 shows a power characteristic curve as a function of the temperature. There, the real power P is plotted as a function of the temperature T, in particular as a set point value for the controller of a wind turbine. For the temperature range as of or above the first limit temperature $T_{G1}$, the characteristic curve depicts a horizontal range 2, with which the value is 100% associated. This 100% relates to the instantaneous maximum power $P_{Max}$ which is able to be generated. If a sufficient wind is present which not too strong, this may correspond to the nominal power $P_N$.

The characteristic curve now shows that for lower temperatures as of the first limit temperature $T_{G1}$, the generated power falls linearly as the temperature falls further. This linearly falling range is depicted as the characteristic curve section 4. This linearly decreasing range 4 extends to the second limit temperature $T_{G2}$. If this second limit temperature is reached, the generated power P is lowered to 0. The vertical section 6 illustrates this. However, this may also mean that the wind turbine continues to be operated without power generation or at least without power feed-in.

The alternative characteristic curve section 8, which is depicted as dashed, illustrates that alternatively, completely lowering the power may also take place earlier, i.e., that the second limit temperature $T_{G2}$ may also be shifted.

These are specific embodiments, and an alternative provides that the power P, as of the first limit temperature $T_{G1}$, is lowered linearly as the temperature falls further in such a way that it reaches the value of 0 upon reaching the second limit temperature $T_{G2}$, so that a vertical section according to the vertical section 6 would be absent.

Analogously to the possibility of changing the second limit temperature $T_{G2}$, as the alternative 8 depicts, the first limit temperature $T_{G1}$ may also be changed. Both limit temperatures may also be changed in order to be able to carry out an adaptation to changed conditions.

Figure 4:
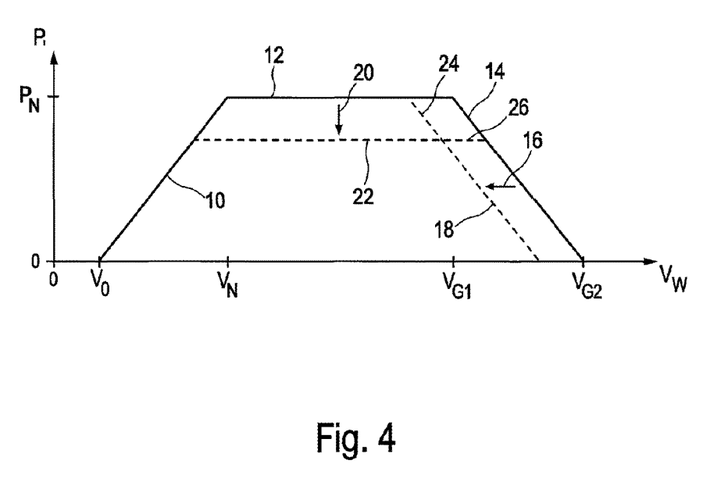
FIG. 4 depicts a wind speed-dependent power characteristic curve having a temperature-dependent variation option.

FIG. 4 partially schematically depicts a wind speed-dependent power characteristic curve. It is basically apparent that the power P is initially 0 at very low wind speeds $V_W$, and increases as the wind speed increases further, as of the starting speed $V_0$. Correspondingly, the characteristic curve depicts a so-called partial load range 10, in which the power has in fact not yet reached its nominal value $P_N$, because the wind is still too weak.

As of the nominal wind speed $V_N$, the power also reaches the nominal power $P_N$, which the horizontally depicted nominal load range 12 illustrates.

If the wind increases still further and reaches the first threshold wind speed $V_{G1}$, the power P is then reduced as the wind speed increases further. This is referred to as the storm range 14. The power may now, for example, decrease linearly or otherwise as the wind speed increases further. This storm range may, for example, be shaped in the form of a linear decrease of the power from the first threshold wind speed $V_{G1}$ up to the second threshold wind speed $V_{G2}$.

According to one specific embodiment, it is now proposed to change this wind speed-dependent power characteristic curve as a function of temperature. It may be provided to reduce the depicted power curve, particularly at very low temperatures, which generally applies here to the ambient temperature, which, for example, may reach −30° Celsius or even −40° Celsius. Thus, according to one specific embodiment, a threshold wind speed change 16 is proposed which is represented in FIG. 4 as an arrow 16. Actually, the two threshold wind speeds $V_{G1}$ and $V_{G2}$ are shifted; therefore, the storm range 14 is shifted to the dashed reduced storm range 18. It is also considered here, for example, to shift only the first threshold wind speed $V_{G1}$ or only the second threshold wind speed $V_{G2}$, or to shift them differently.

An additional specific embodiment proposes lowering the power overall as a function of temperature, i.e., carrying out a change in the maximum power 20, which is illustrated by the arrow 20 pointing downward. A reduced maximum power 22 then results, which is depicted as a horizontal dashed line. Such a reduction of the maximum power is thus proposed as a function of temperature, i.e., for very low temperatures such as −30° Celsius or even −40° Celsius, and may be provided piecewise or continuously with the temperature. The reduction of maximum power and/or the change in the threshold speed may be thus in principle be carried out as a function of temperature, as FIG. 3 depicts the reduction of the power P, in particular illustrated in the linearly falling range 4. Actually, the shift of the threshold speeds $V_{G1}$ and $V_{G2}$, i.e., the horizontal shift according to the arrow 16 of FIG. 4, may be also be depicted as a lowering of the storm range 14. This lowering may also carried out as illustrated in FIG. 3 by the linearly falling range 4.

If the power curve of FIG. 4 is carried out overall, i.e., for the nominal load range 12 and the storm range 14, the dashed curve assembled from the sections 22 and 18 results, without the alternative section 24 and 26.

According to one specific embodiment, the partial load range 10 may also be changed as a function of temperature. Typically, however, the load in the partial load range is generally small, so that a reduction there should preferably not be carried out.

Moreover, FIG. 4 illustrates the relationship of the power as a function of the wind speed, and the option of reducing this power as a function of temperature, particularly for very low temperatures. The illustration and the explanations there apply in an entire similar manner to a wind speed-dependent rotational speed characteristic curve. Even the wind speed-dependent benchmark values, i.e., in particular the nominal wind speed $V_N$, the first threshold wind speed $V_{G1}$ and the second threshold wind speed $V_{G2}$, may be identical for such a rotational speed characteristic curve. Of course, the amplitude of the rotational speed is a different one due to the different physical unit.

Moreover, as proposed according to one specific embodiment, a temperature-dependent rotational speed reduction may also be carried out in a way such as is illustrated for the power in FIG. 3. There as well, the same limit temperatures or different limit temperatures may be used. Particularly, setting a first limit temperature to a value of −30° Celsius and a second limit temperature to a value of −40° Celsius, as shown in FIG. 3, is a preferred embodiment, which allows operating the wind turbine in a large temperature range, i.e., above the exemplary −30° Celsius, without a reduction, and proposes a reduction for protecting the turbine only at very low temperatures. According to one specific embodiment, the first threshold wind speed $V_{G1}$ and correspondingly the second threshold speed $V_{G2}$ may be calculated according to the following formulas as a function of the temperature T:

$$V_{G1}=V_{G1\_0}*(1+k_1*(T-T_1)/T_1)$$

$$V_{G2}=V_{G2\_0}*(1+k_2*(T-T_2)/T_2)$$

$T_1$ and $T_2$ are the first and second reference temperatures and $V_{G1\_0}$ and $V_{G2\_0}$ are the basis values of the first and second threshold wind speeds, where $V_{G1\_0}$ is less than $V_{G2\_0}$. The factors $k_1$ and $k_2$ are weighting factors, which may also be equal. The reference temperatures $T_1$ and $T_2$ may also be equal, or they may be the first and second limit temperatures.

The invention claimed is:

1. A method comprising:
   feeding electric energy into an electric power supply network by a wind turbine, wherein the feeding includes:
   using the wind turbine to generate electric power from wind having a variable wind speed by an aerodynamic rotor and a generator, wherein the wind turbine provides at least some of the generated electric power to at least one of the electric power supply network and electric devices of the wind turbine, wherein at least one of:
   the generated electric power is set as a function of an ambient temperature; and
   the rotor has a variable rotational speed and the rotational speed is set as a function of the ambient temperature; and
   shutting down the wind turbine when a second temperature threshold is reached that is lower than a first temperature threshold,
   wherein after the first temperature threshold has been reached and as the temperature continues to reduce, at least one of the generated electric power and the rotational speed is reduced, wherein the generated electric power and the rotational speed is reduced linearly as the temperature continues to reduce.

2. The method according to claim 1, wherein at least a portion of the generated power is used for:
   heating rotor blades of the rotor,
   heating the generator,
   heating at least one droplet separator for drying air,
   heating at least one measuring device,
   heating at least one control device, and
   heating at least one internal space of the wind turbine.

3. The method according to claim 1, wherein at least one of the generated electric power and the rotational speed is set as a function of the wind speed.

4. The method according to claim 1, wherein at least one of the first and second temperature thresholds is set as a function of a prevailing wind speed.

5. The method according to claim 3, wherein the at least one of the generated electric power and the rotational speed is reduced when the wind speed exceeds a first wind speed threshold, wherein the at least one of the generated electric power and the rotational speed is reduced further until the wind speed reaches a second wind speed threshold, wherein the second wind speed threshold is higher than the first wind speed threshold, wherein at least one of the first and the second wind speed thresholds is set as a function of the ambient temperature in such a way that the lower the ambient temperature is, the lower the first or the second wind speed threshold is set.

6. The method according to claim 1, wherein the wind turbine is configured to feed in reactive power into the electric power supply network by the wind turbine and to control the feed-in of the reactive power as a function of at least one of the ambient temperature and the wind speed.

7. A wind turbine configured to implement the method according to claim 1.

8. The wind turbine according to claim 7, wherein the wind turbine has heatable droplet separators and heatable switch cabinets for drying internal air of the wind turbine, wherein the droplet separators and the heatable switch cabinets are heated as soon as an internal temperature or ambient temperature falls below a trigger temperature for triggering the heating.

9. A wind farm including a plurality of wind turbines according to claim 7.

10. The wind farm according to claim 9, wherein all of the wind turbines of the wind farm feed into the electric power supply network via a shared network feed-in point, are controlled via a central wind farm controller, and use the same ambient temperature.

11. The wind farm according to claim 10, wherein a shared temperature sensor is provided for measuring the same ambient temperature and a shared wind speed sensor is provided for measuring the wind speed.

12. The method according to claim 1, wherein the wind turbine is operated in an operating state in a reduced states such that only an amount of electric power is generated that is required for powering the electric devices, and all of the generated electric power is used for powering the electric devices.

13. The method according to claim 3 wherein at least one of the generated electric power and the rotational speed is reduced linearly as the wind speed increases.

14. The method according to claim 4 wherein at least one of the first and second temperature thresholds is set as a function of a 10 minute average value of the wind speed.

15. The method according to claim 6, wherein after the first temperature threshold has been reached, the fed-in reactive power is reduced linearly as a function of the temperature.

16. The method according to claim 6, wherein after the first threshold wind speed has been reached, the fed-in reactive power is reduced linearly as a function of the wind speed.

17. The method according to claim 6, wherein after the first temperature threshold has been reached, the fed-in reactive power is reduced as the temperature continues to drop, wherein fed-in reactive power is reduced linearly as the temperature drops, or after the first threshold wind speed is reached, the fed-in reactive power is reduced as the wind speed continues to increase, wherein the fed-in reactive power is reduced linearly as the wind speed increases.

* * * * *